(12) United States Patent
Papakipos et al.

(10) Patent No.: US 9,092,078 B2
(45) Date of Patent: *Jul. 28, 2015

(54) SOFT CONTROL USER INTERFACE WITH TOUCHPAD INPUT DEVICE

(71) Applicant: Facebook, Inc., Menlo Park, CA (US)

(72) Inventors: Matthew Nicholas Papakipos, Palo Alto, CA (US); Matthew Cahill, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/335,340

(22) Filed: Jul. 18, 2014

(65) Prior Publication Data

US 2014/0327639 A1 Nov. 6, 2014

Related U.S. Application Data

(63) Continuation of application No. 13/275,145, filed on Oct. 17, 2011, now Pat. No. 8,830,191.

(51) Int. Cl.
G06F 3/041 (2006.01)
G06F 3/0354 (2013.01)
G06F 1/16 (2006.01)
G06F 3/0488 (2013.01)
G06F 3/0484 (2013.01)
H04N 5/232 (2006.01)

(52) U.S. Cl.
CPC ............ *G06F 3/03547* (2013.01); *G06F 1/169* (2013.01); *G06F 1/1626* (2013.01); *G06F 3/04847* (2013.01); *G06F 3/04883* (2013.01); *H04N 5/23216* (2013.01)

(58) Field of Classification Search
USPC .................. 345/173; 178/18.01; 715/701–702
See application file for complete search history.

(56) References Cited

U.S. PATENT DOCUMENTS

2011/0122085 A1* 5/2011 Chang ........................... 345/174
2013/0093689 A1* 4/2013 Papakipos et al. ............ 345/173

* cited by examiner

Primary Examiner — Abbas Abdulselam
(74) Attorney, Agent, or Firm — Baker Botts L.L.P.

(57) ABSTRACT

In one embodiment, a computing device displays a graphical parameter-control element in a graphical user interface indicating a range and a position value of a controllable parameter of an application of the computing device. The computing device may detect a touch event on a touchpad of the computing device. The computing device may determine that the touch event is a scrolling event, and scroll the position value along the range based on a direction of the scrolling event, and adjust the position value by a relative amount within the range mapping to a relative distance of the scrolling event along the touchpad.

18 Claims, 20 Drawing Sheets

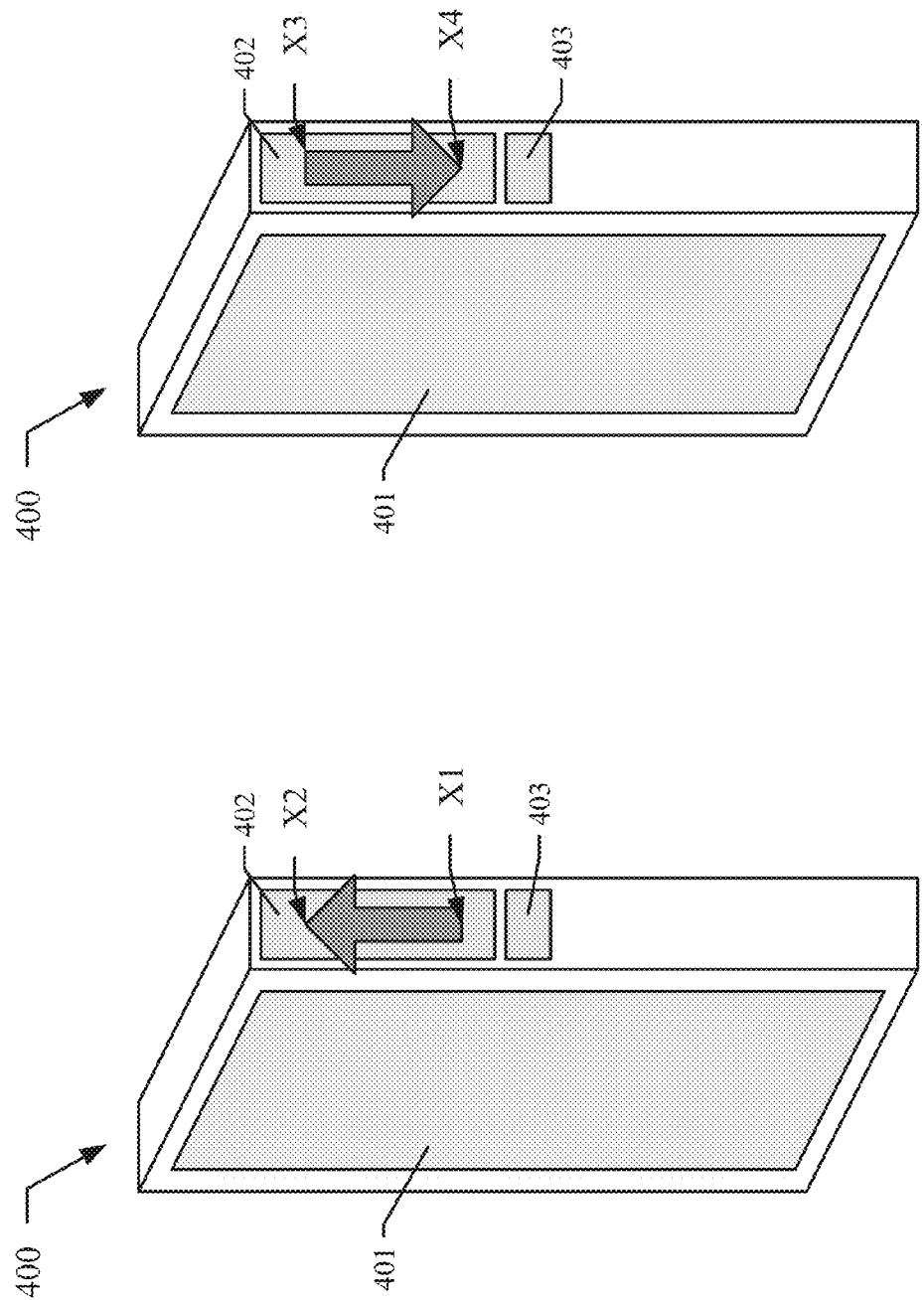

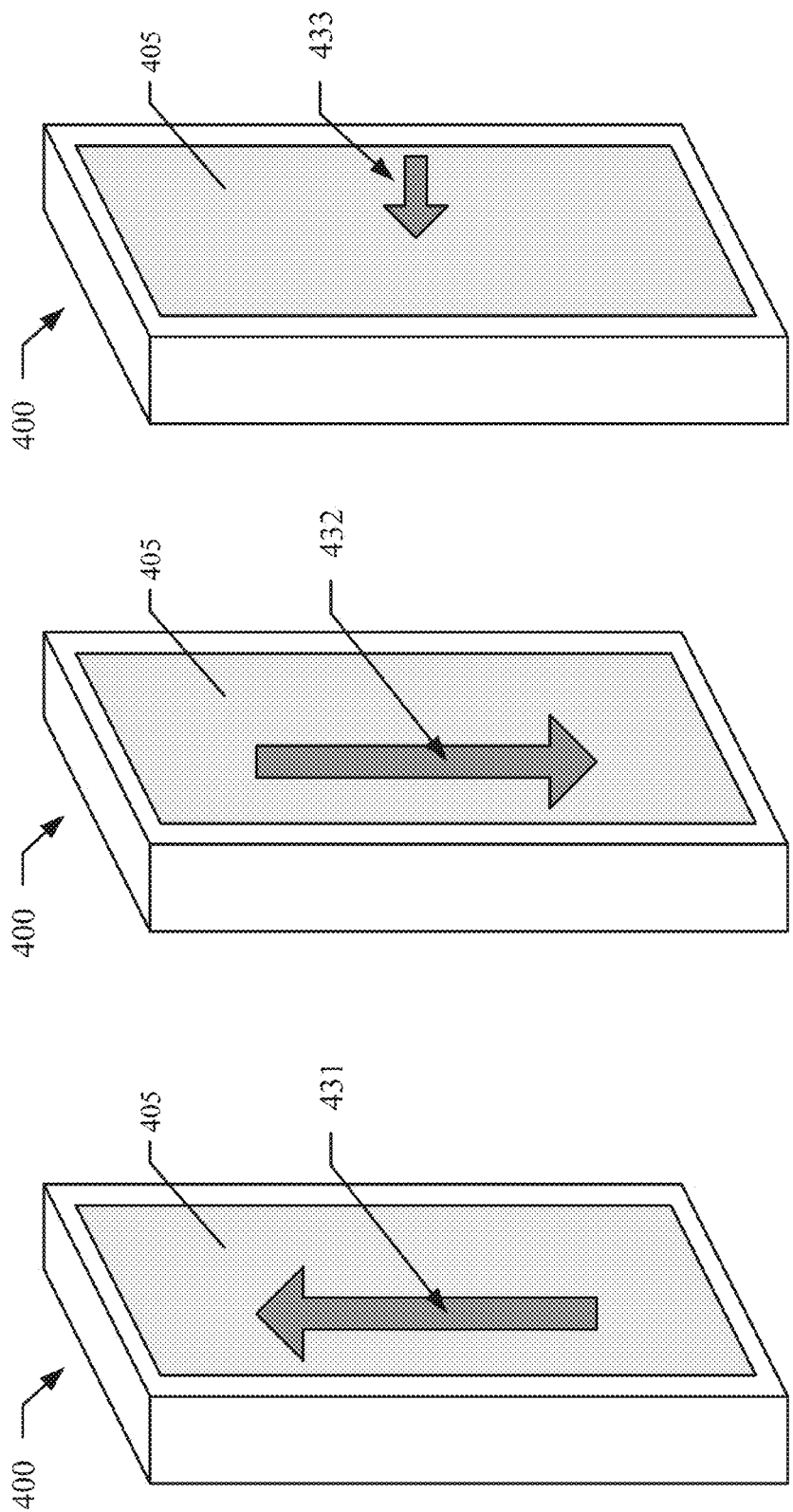

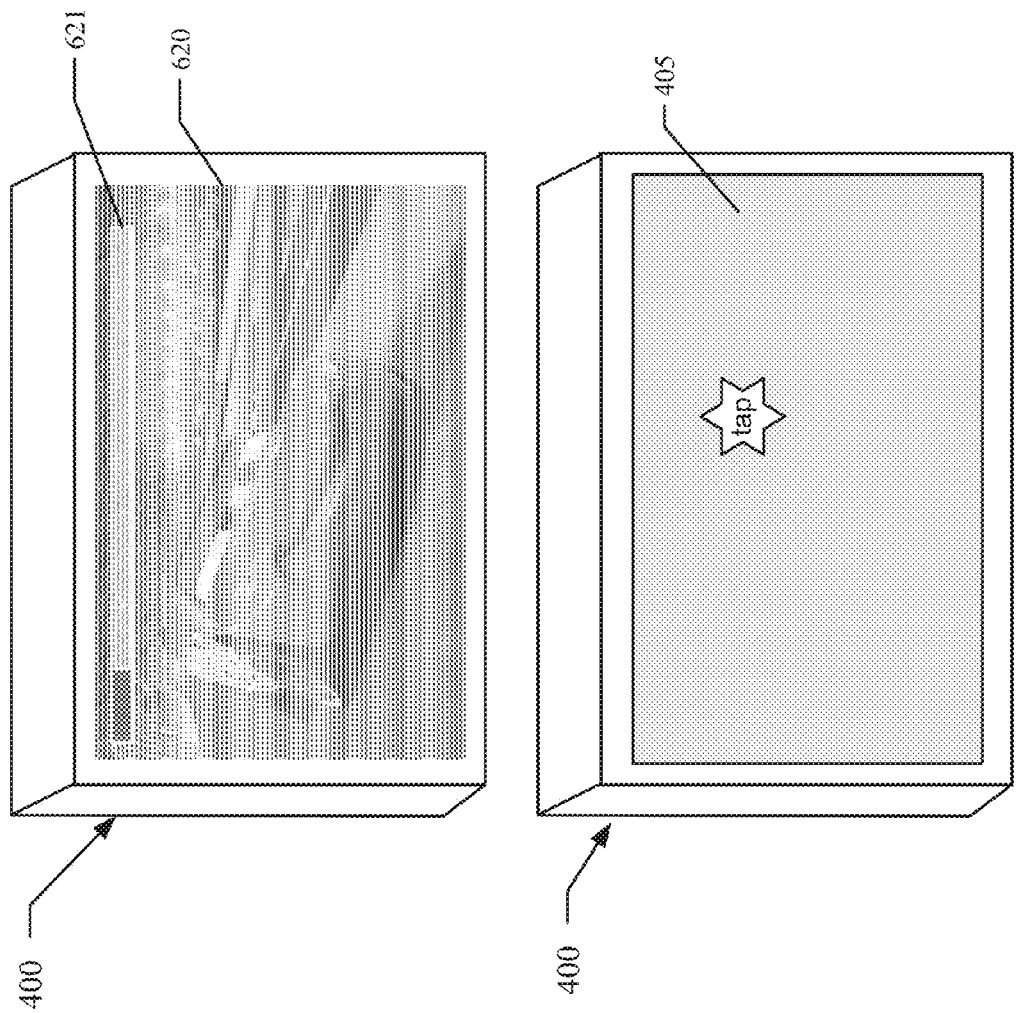

SOFT CONTROL USER INTERFACE WITH TOUCHPAD INPUT DEVICE

RELATED APPLICATIONS

This application is a continuation under 35 U.S.C. §120 of U.S. patent application Ser. No. 13/275,145, filed 17 Oct. 2011.

TECHNICAL FIELD

The present disclosure relates generally to touch-based user interfaces, and more particularly to, adjusting a controllable parameter of an application hosted by a computing device having a side-mounted touchpad.

BACKGROUND

A touchpad is an input device including a surface that detects touch-based inputs of users. A touch screen is an electronic visual display that detects the presence and location of user touch inputs. Mobile devices such as a mobile phone, a tablet computer, and a laptop computer often incorporate a touch screen or a touchpad to facilitate user interactions with application programs running on the mobile device.

SUMMARY

Particular embodiments relate to touch-based user interfaces that allows a user of a mobile device to adjust a controllable parameter of an application hosted by the mobile device by using touch inputs to a touchpad disposed on a lateral edge of the mobile device. These and other features, aspects, and advantages of the disclosure are described in more detail below in the detailed description and in conjunction with the following figures.

BRIEF DESCRIPTION OF THE DRAWINGS

FIGS. 5A-5C illustrate example touch events associated with the example mobile device of FIG. 4.

FIGS. 5D-5F illustrate example touch events associated with the example mobile device of FIG. 4B.

FIGS. 6F and 6G illustrate examples of controlling an application parameter by using a back-mounted touch surface.

DETAILED DESCRIPTION

The invention is now described in detail with reference to a few embodiments thereof as illustrated in the accompanying drawings. In the following description, numerous specific details are set forth in order to provide a thorough understanding of the present disclosure. It is apparent, however, to one skilled in the art, that the present disclosure may be practiced without some or all of these specific details. In other instances, well known process steps and/or structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

Figure 1:
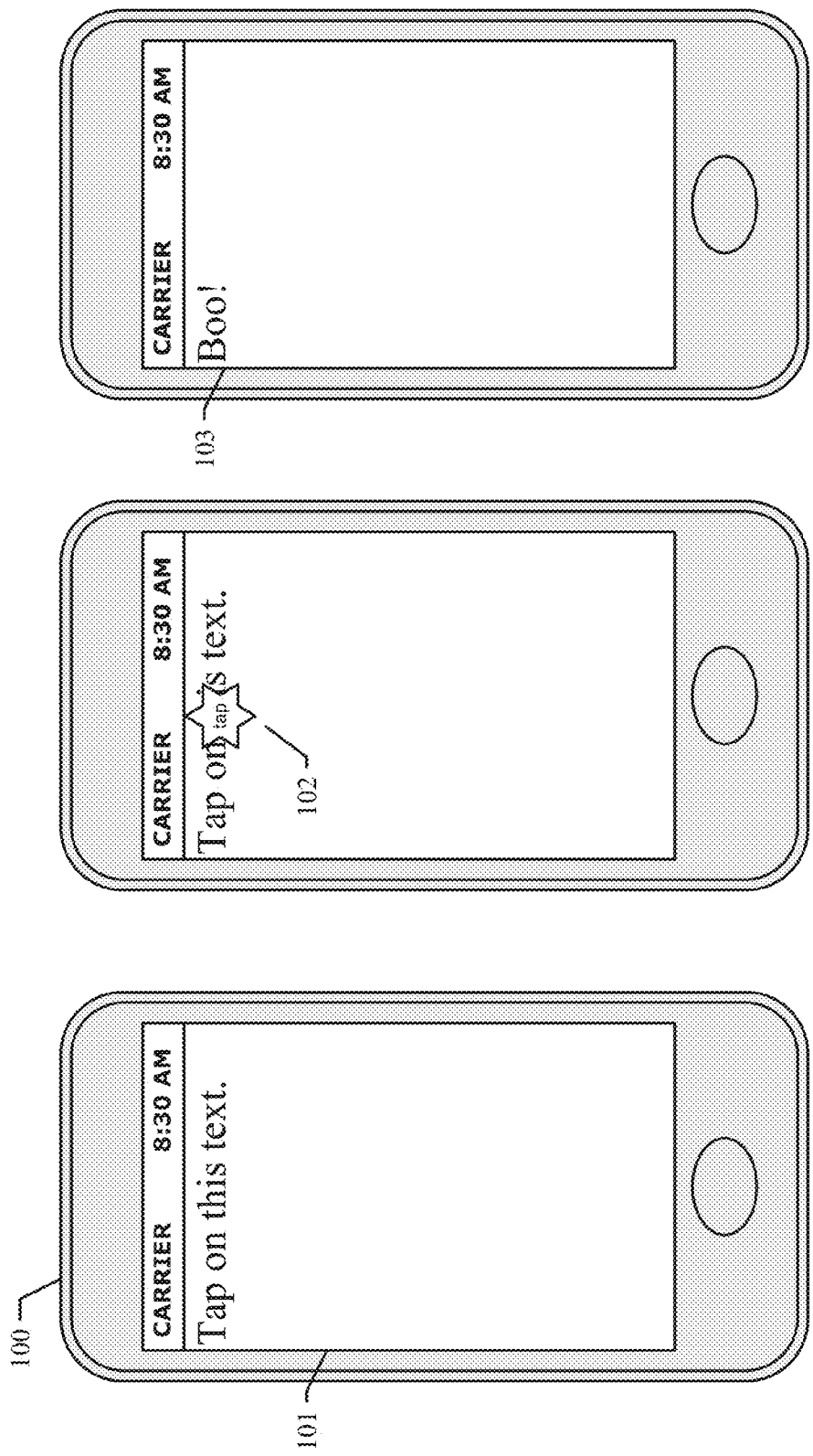
FIG. 1 illustrates an example touch screen of a mobile phone that hosts a browser client displaying a web page.

A touchpad is an input device including a surface that detects touch-based inputs of users. Similarly, a touch screen is an electronic visual display that detects the presence and location of user touch inputs. So-called dual touch or multi-touch displays or touchpads refer to devices that can identify the presence, location and movement of more than one touch input, such as two or three finger touches. A system incorporating one or more touch-based input devices may monitor one or more touch-sensitive surfaces for one or more touch or near touch inputs from a user. When one or more such user inputs occur, the system may determine the distinct area(s) of contact and identify the nature of the touch or near touch input(s) via geometric features and geometric arrangements (e.g., location, movement), and determine if they correspond to various touch events (e.g., tap, drag, swipe, pinch). These touch events may then be processed by handler functions that register or subscribe as listeners to such events, as illustrated in FIG. 1. FIG. 1 illustrates an example touch screen of a mobile phone that hosts a browser client displaying a web page. In the example of FIG. 1, touch screen 101 of mobile phone 100 displays an HTML/JavaScript code snippet displaying a text string "Tap on this text", as listed below.

```
<html>
<!-- pseudo-code to include a touch event listener from a touch events
library
library TouchEventsLibrary
function onTapEvent
-->
<body>
<h1 onTapEvent="this.innerHTML='Boo!'">Click on this text</h1>
</body>
</html>
```

As a user taps on the text string "Tap on this text." (102), a touch event listener "on TouchEvent" can trigger an action of changing the text string from "Tap on this text." to "Boo!" (103).

Figure 2:
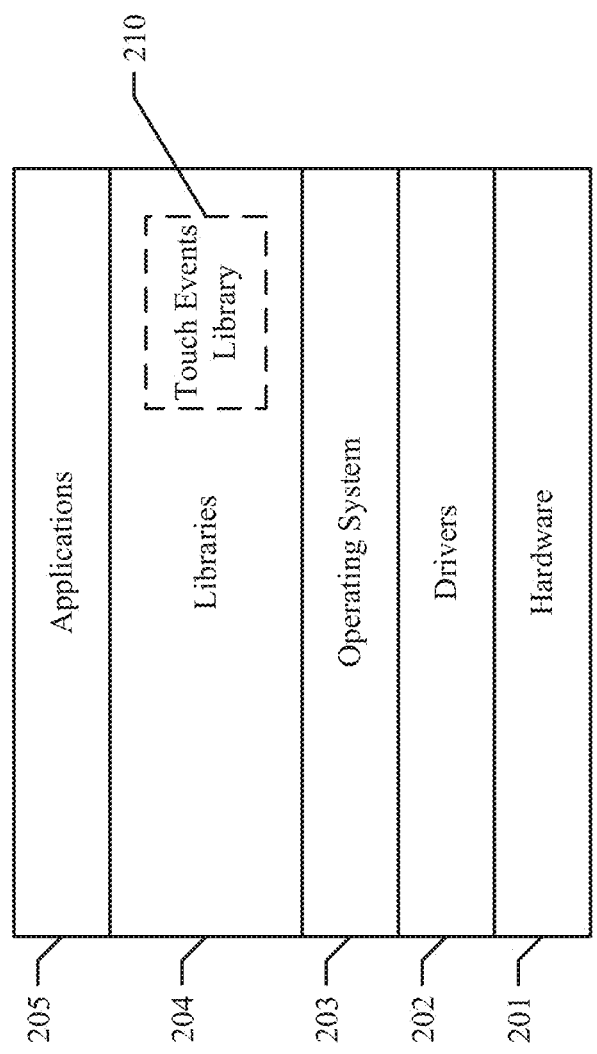
FIG. 2 illustrates an example processing stack of a mobile device with touch-based input device(s).

Recognition of touch events by a system with one or more touch-based input devices—i.e., identifying one or more touch inputs by a user and determining corresponding touch event(s)—may be implemented by a combination of hardware, software, and/or firmware (or device drivers). FIG. 2 illustrates an example processing stack of a mobile device (e.g., a smart phone) with touch-based input device(s). Hardware layer 201 can include one or more processors and various hardware input/output devices such as camera, communication interface, and touch-based input device (e.g., touch screen, touchpad). Drivers layer 202 includes one or more drivers that communicate and control hardware layer 200, for example, a driver receiving and processing touch input signals generated by a touch-screen display. Operating system 203 runs computing programs and manages hardware layer 201 via one or more drivers in driver layer 202. Libraries 204 include one or more libraries used by one or more application programs in applications 205 (e.g., web browser, address book, etc.). For example, touch events library 210 can contain codes that interpret touch inputs to touch events or gestures, and a web browser application program can access touch event library 210 (e.g., via function calls) and process a web page with touch event handlers embedded within the page, as illustrated in FIG. 1 and in the HTML/JavaScript code snippet above.

Figure 3A:
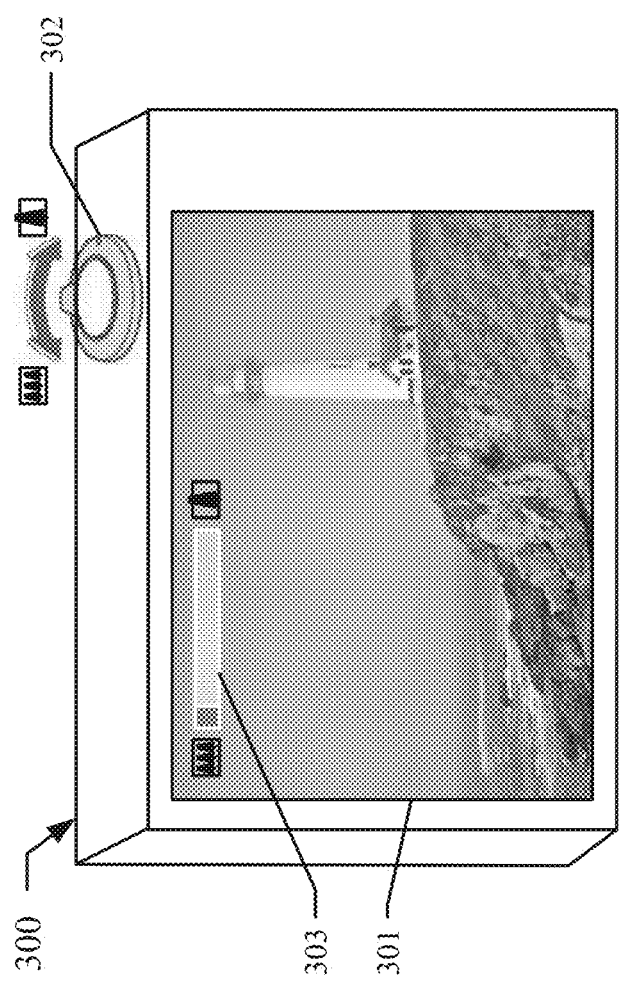
FIGS. 3A and 3B illustrate an example digital camera.
Figure 3B:
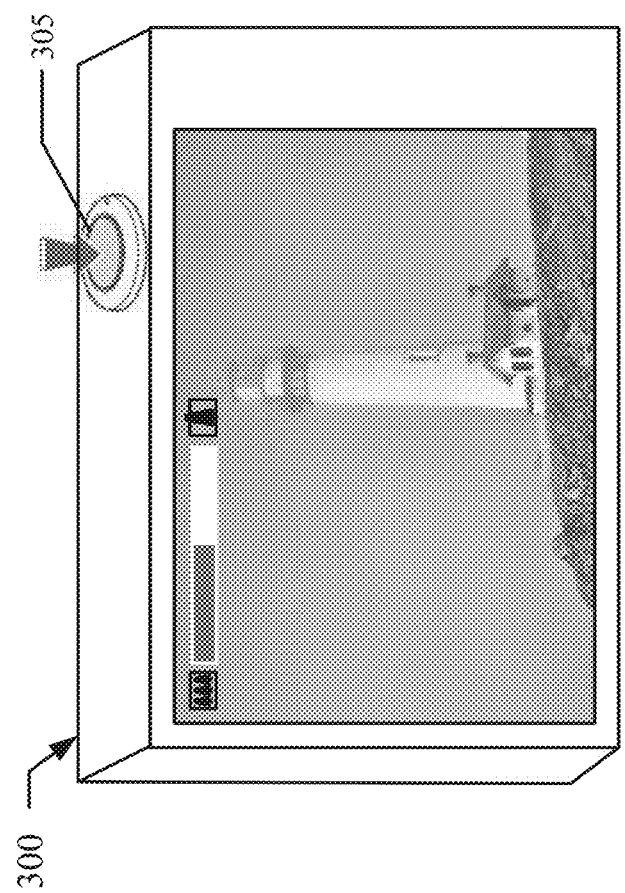

A user of an electronic device can control an application (or a function) hosted by the device by using various user interface controls and input devices to control one or more parameters associated with the application or function. FIGS. 3A and 3B illustrate an example digital camera. In the example of FIG. 3A, a user of digital camera 300 can use viewfinder screen 301 and other input devices to compose and focus an image. For example, the user can use a hardware zoom lever 302 to adjust focal length, i.e., zoom in on an subject or zoom away from the subject. For example, digital camera 300 can display a zoom bar 303 in viewfinder 301, indicating a current value of focal length or zoom distance. For example, after adjusting to a desirable zoom distance, the user can press a hardware shutter button 305 to capture the image (e.g., capture a digital image and save the image in a flash memory card of digital camera 300), as illustrated in FIG. 3B.

Figure 3E:
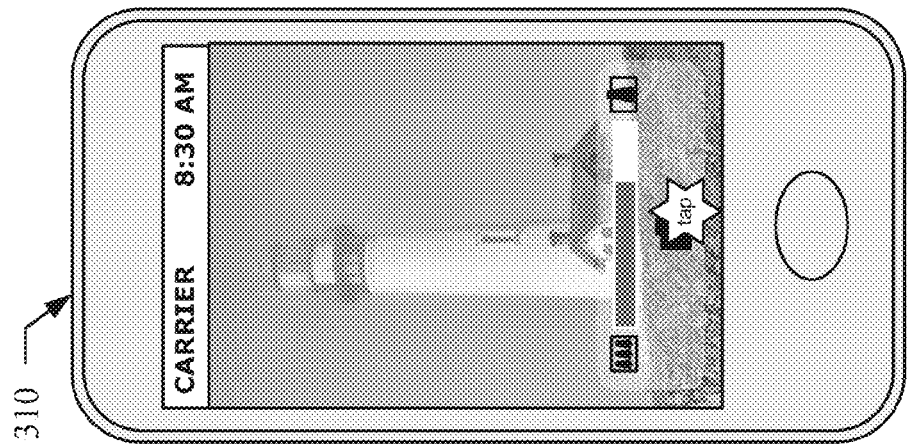
FIG. 3C-3E illustrate an example user interface of an camera application hosted by a touch-screen mobile phone.
Figure 3D:
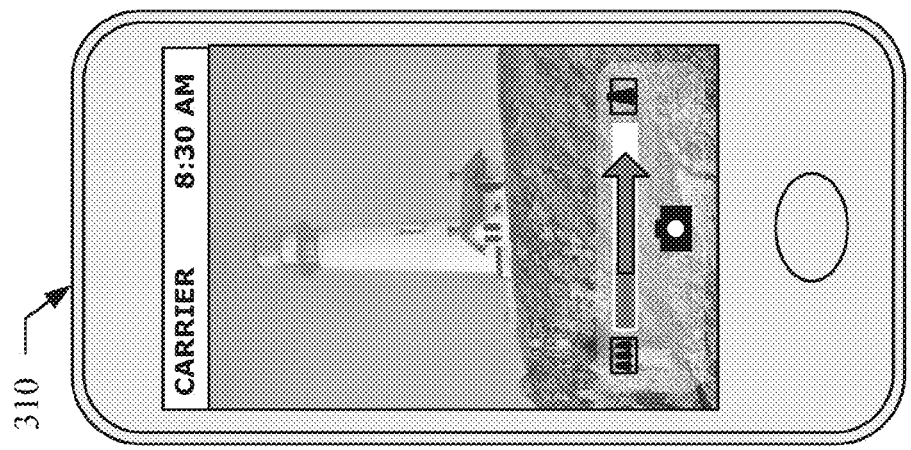
Figure 3C:
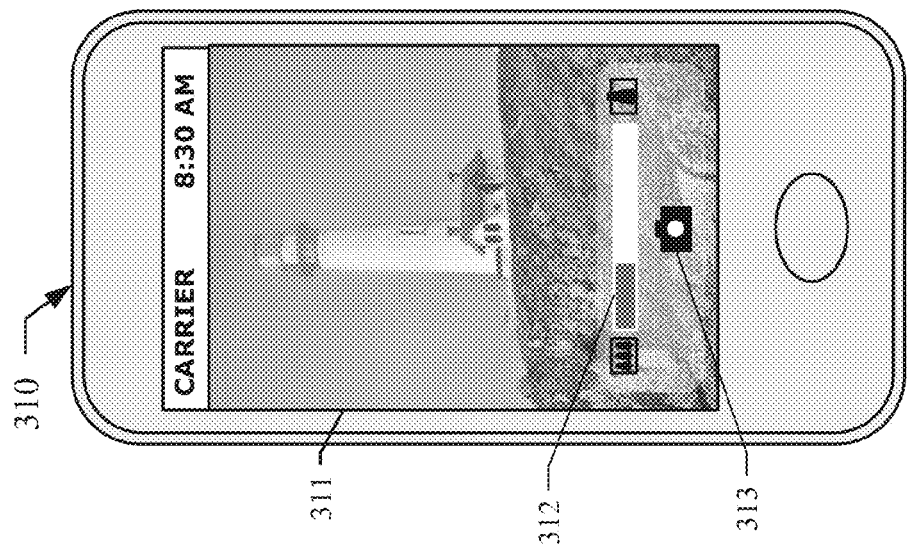

FIGS. 3C-3E illustrate an example user interface of a camera application hosted by a touch-screen mobile phone. In the examples of FIG. 3C, a camera application of mobile phone 310 can display its graphic user interface 311 within the mobile phone's touch screen. For example, the graphic user interface 311 can include a selectable zoom bar 312 indicating a current value of zoom distance of an image displayed in the graphic user interface, and a selectable capture icon 313. For example, a user of mobile phone 310 can swipe along zoom bar 312 on the touch screen to zoom in on a subject, as illustrated by the arrow in FIG. 3D. For example, after adjusting to a desirable zoom distance, the user can tap on capture icon 313 to capture the image, as illustrated in FIG. 3E.

Figure 3F:
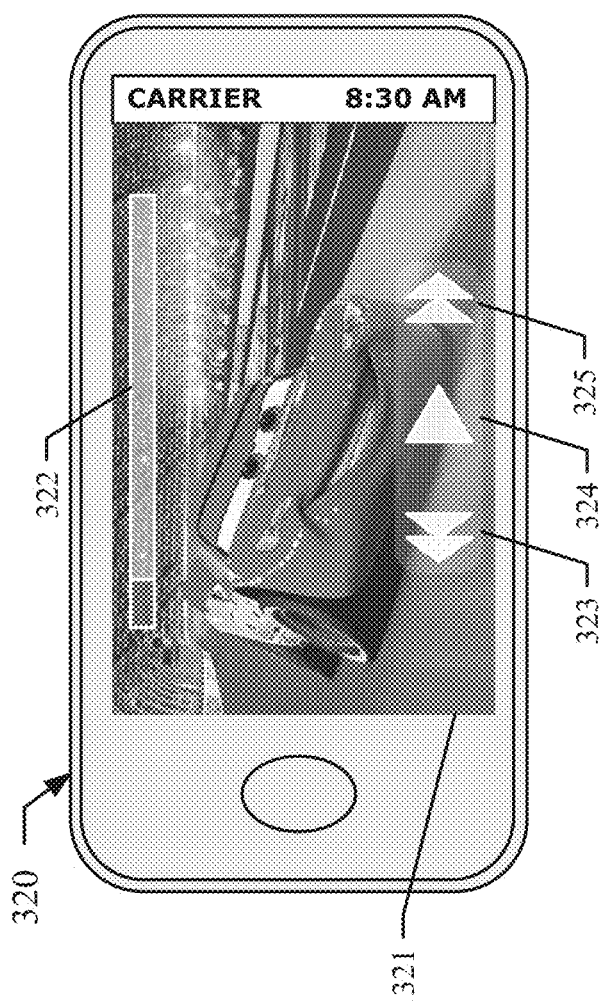
FIG. 3F illustrates an example user interface of a media player application hosted by a mobile phone.

FIG. 3F illustrates an example user interface of a media player application hosted by a mobile phone. In the example of FIG. 3F, a media player application can display its graphical user interface 321 within the mobile phone's touch screen. For example, graphic user interface 321 can include a playtime status bar 322, indicating a current play time of a video. Graphical user interface 321 can include selectable icons for controlling of playing of the video, e.g., Fast Rewind icon 323, Play/Pause icon 324, and Fast Forward icon 325. For example, a user can swipe along playtime status bar 322 on the touch screen to jump to a particular play time of the video. For example, a use can tap on Play/Pause icon 324 on the touch screen to play or pause the video.

Particular embodiments herein relate to a computing device (such as a mobile phone, netbook, smartphone, tablet, laptop computer, monitor, or other portable device) with a touch screen and one or more side-mounted touchpads and methods of allowing users to use the one or more side-mounted touchpads to control applications hosted by the computing device. Particular embodiments can improve user experience associated with mobile devices as the side-mounted touchpad(s) can offload user interaction to the side-mounted touchpad(s) and yield better usage of the touch screen (e.g., uninterrupted viewing of a content displayed by the touch screen).

Figure 4:
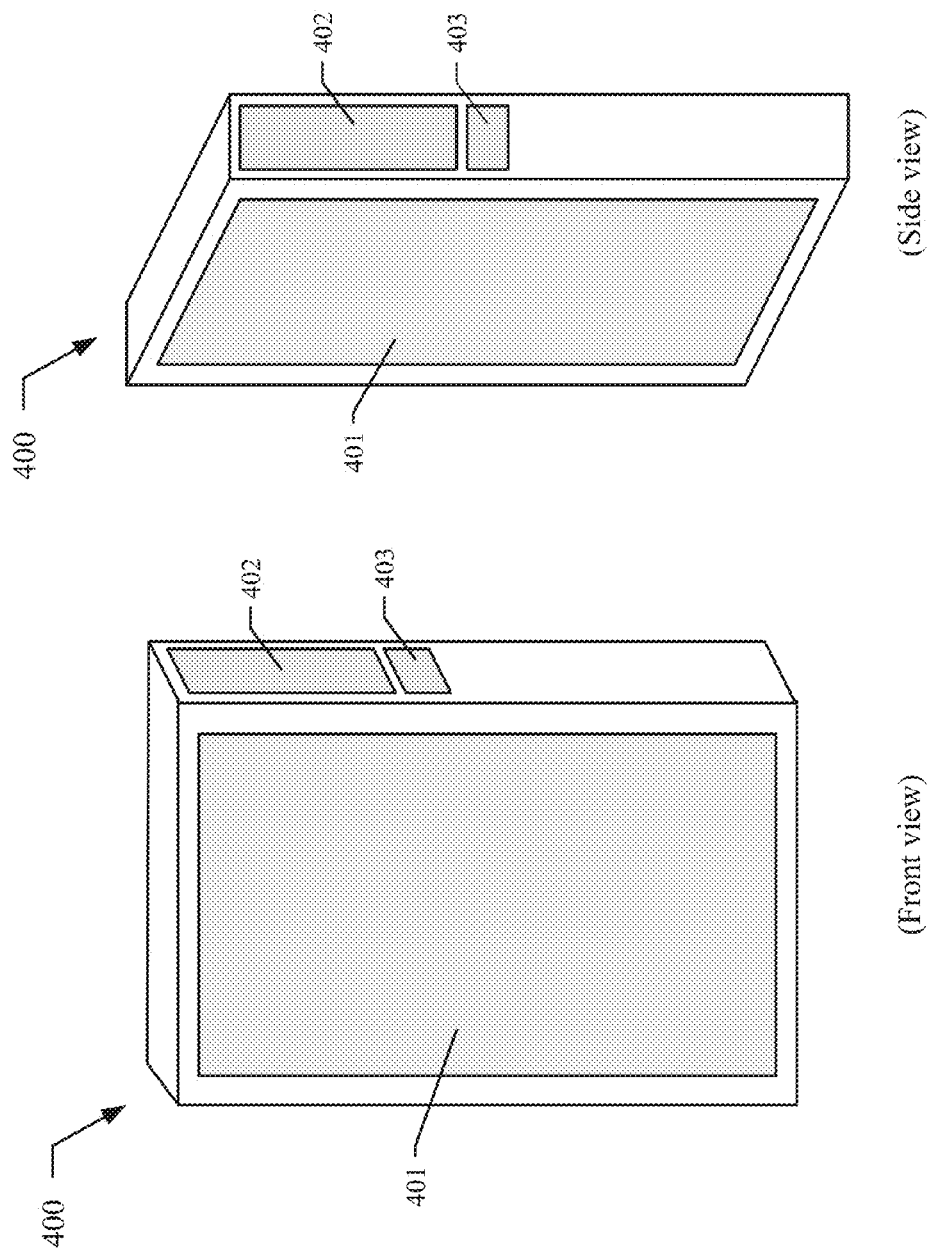
FIG. 4 illustrates a front view and a side view of an example mobile device with a front-mounted touch screen and a side-mounted touchpad.
Figure 4A:
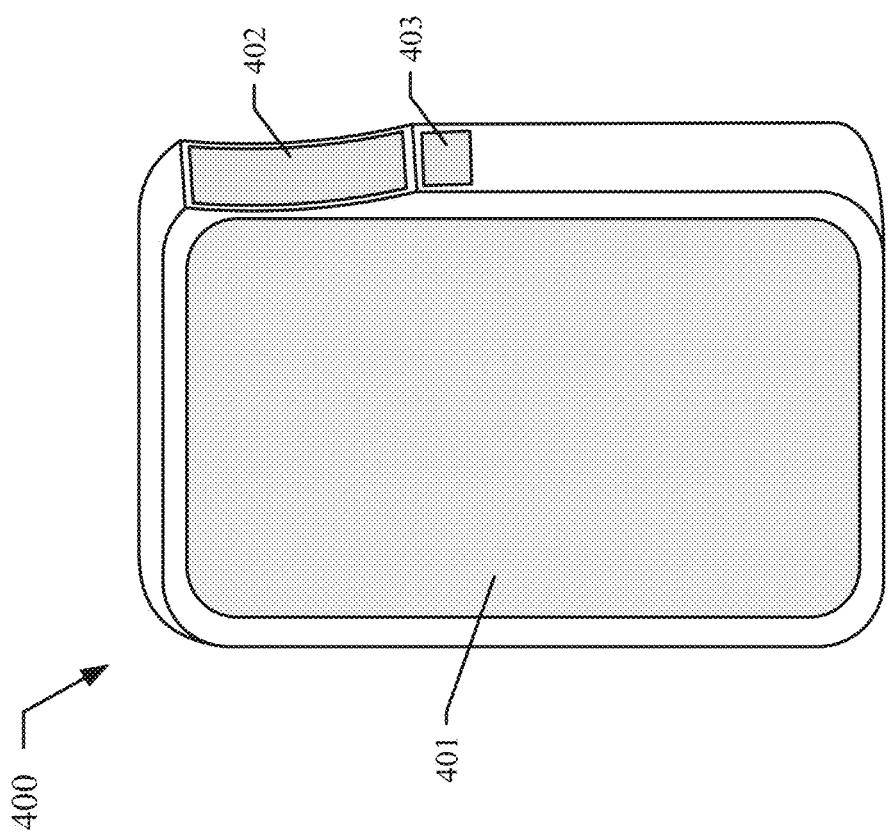
FIG. 4A illustrates another example of the mobile device in FIG. 4.
Figure 4B:
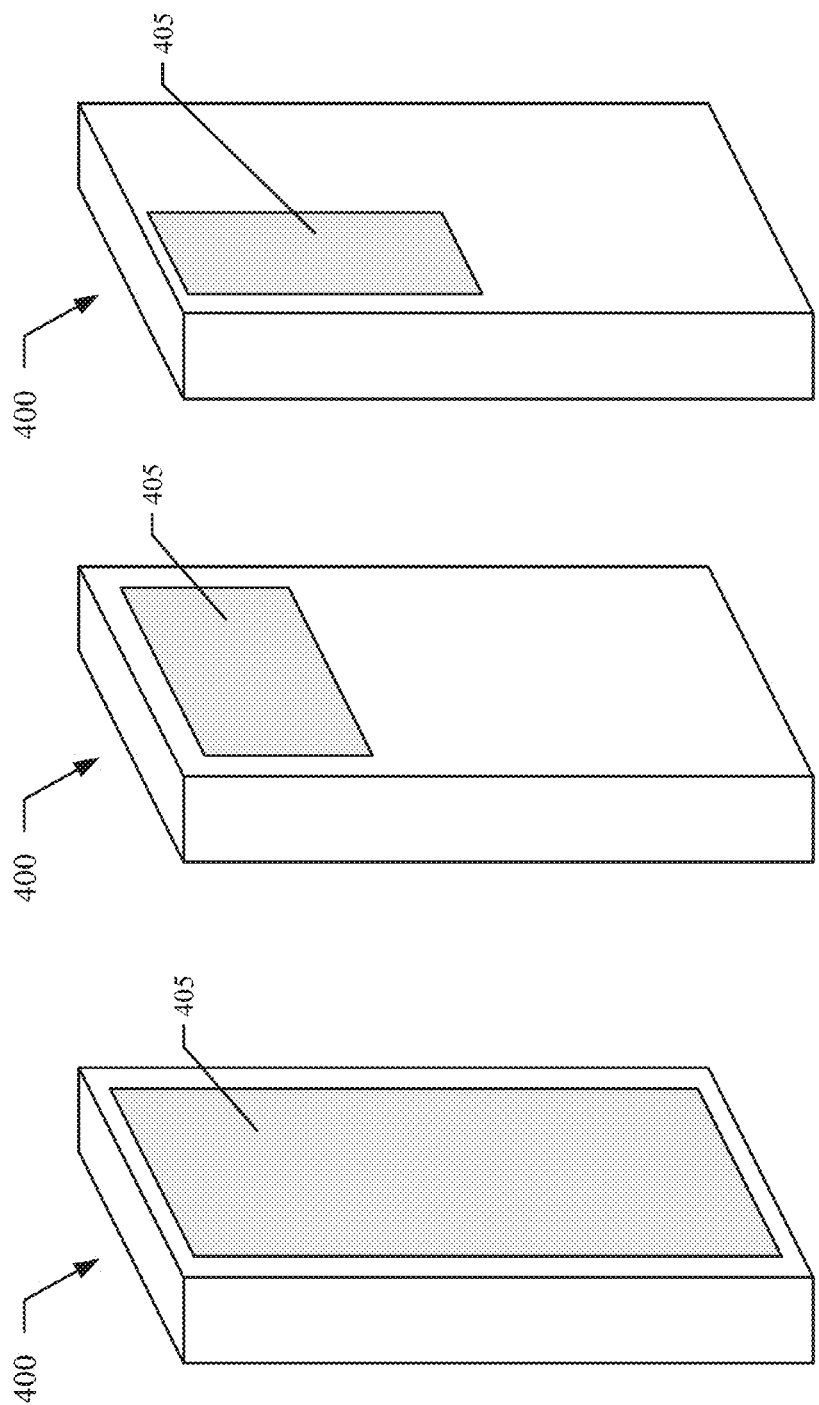
FIG. 4B illustrates an example mobile device with a back-mounted touch surface.

FIG. 4 illustrates a front view and a side view of an example mobile device with a front-mounted touch screen and a side-mounted touchpad. In particular embodiments, mobile device 400 may comprise a housing with multi-touch touch screen 401 disposed on a front face of the housing. The mobile device 400 may also include a side-mounted multi-touch touchpad 402 and a side-mounted single-touch touchpad 403, both disposed on a lateral face or edge of the device 400. In particular embodiments, mobile device 400 may include hardware and/or software that supports or implements a variety of functions. For example, mobile device 400 may support telephony functions, chat and/or email functions. Mobile device 400 may also support network data communications and include a web browser for accessing and displaying web pages. Mobile device 400 may also support or incorporate, a Wi-Fi base station functions, a digital media player functions, and/or a gaming device functions. In one embodiment, side-mounted touchpad 403 may be replaced by a clickable button or keypad device. In another embodiment, the side-mounted touchpad 403 may be a multi-touch touchpad. In some implementations, the touchpad 402 may be a single- or multi-touch device. In some embodiments, side-mounted touchpad 402 may comprise a slightly concave multi-touch surface, as illustrated in FIG. 4A. The touch screen 401 and side-mounted touchpad 403 may be single-touch, dual-touch or multi-touch devices. In addition, implementations of the invention can operate without a touch screen device, relying instead on a regular display device and a pointer device, such as a trackball or trackpad. In other embodiments, mobile device 400 may include a back-mounted touch surface 405 on a back side of mobile device 400. The back-mounted touch surface 405 may cover substantially all or a portion of a back side of mobile device 400, as illustrated in FIG. 4B. The back-mounted touch surface 405 may comprise a multi-touch touchpad or a multi-touch touch screen.

Mobile device 400 may recognize touch inputs, and determine one or more corresponding touch events or gestures. One or more applications hosted on mobile device 400 may be configured to register a handler function that responds to the one or more touch events. In particular embodiments, mobile device 400 may recognize one or more user touch inputs performed on touch screen 401, touchpad 402, touchpad 403, and/or back-mounted touch surface 405, and determine one or more corresponding touch events. In particular embodiments, mobile device 400 may detect an upward scrolling event associated with touchpad 402 based on a corresponding scrolling touch gesture of a user, as illustrated in FIG. 5A. In the example of FIG. 5A, a user touches touchpad 402 in an upward motion (e.g., the user's finger touches touchpad 402 at a start location X1, moves the finger upwards while the finger is still in contact with touchpad 402, and the finger lifts away from touchpad 402 at an end location X2 wherein the end location X2 is closer to the top of mobile device 400 then the start location X1, as indicated by the arrow in FIG. 5A). A gesture recognition library of mobile device 400 may access data generated by the touchpad 402 and determine an upward scrolling event or gesture associated with touchpad 402. A handler function associated with an application or operating system shell may cause a document or other displayed content to scroll. In particular embodiments, mobile device 400 may determine a downward scrolling event associated with touchpad 402, as illustrated in FIG. 5B. In the example of FIG. 5B, a user touches touchpad 402 in a downward motion (e.g., the user's finger touches touchpad 402 at a start location X3, moves the finger downwards while the finger is still in contact with touchpad 402, and the finger lifts away from touchpad 402 at an end location X4 wherein the start location X3 is closer to the top of mobile device 400 then the end location X4, as indicated by the arrow in FIG. 5B), and mobile device 400 may determine a downward scrolling event associated with touchpad 402. The upwards or downwards gestures made by a user may be controlled scrolling gestures where the movement is slow relative to a swiping gesture where the associated downward or upward movement is relatively abrupt or fast. A gesture recognition library of mobile device 400 may interpret the inputs from touchpad 402 to recognize either gesture type. A handler function may respond differently between a controlled scroll and a swipe gesture. For example, a swipe gesture may cause an application to rapidly scroll a document based on the speed of the swipe. On the other hand, an application may respond to a controlled scrolling event by scrolling the document or other content in a manner proportional to the user's movements relative to touchpad 402.

Additionally, in particular embodiments, mobile device 400 may determine a relative distance for a scrolling event. For example, mobile device 400 can determine an absolute distance between a start location X1 and an end location X2 illustrated in FIG. 5A (or between a start location X3 and an end location X4 in FIG. 5B), and determine a relative percentage distance (e.g., 60%) by dividing the absolute distance by the length of touchpad 402.

Figure 5C:
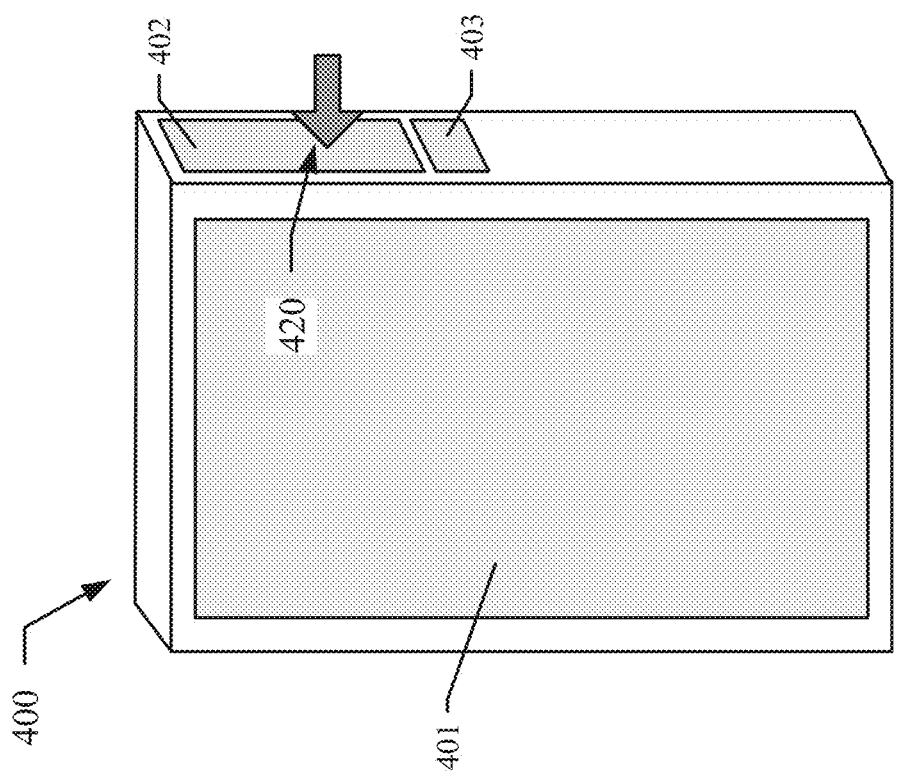

In particular embodiments, mobile device 400 may identify a tap event associated with touchpad 402, as illustrated in FIG. 5C. In the example of FIG. 5C, a user taps or strikes lightly on touchpad 402 (as indicated by the arrow 420). A gesture recognition library of mobile device 400 can interpret the user's touch input and identify the touch input corresponding to a tap event.

In other embodiments, mobile device 400 may identify touch events associated with back-mounted touch surface 405, as illustrated in FIGS. 5D-5F. In the example of FIG. 5D, a user touches back-mounted touch surface 405 in an upward motion (as indicated by the arrow 431). A gesture recognition library of mobile device 400 can interpret the user's touch input and identify the touch input corresponding to an upward scrolling event or gesture associated with back-mounted touch surface 405. In the example of FIG. 5E, a user touches back-mounted touch surface 405 in a downward motion (as indicated by the arrow 432). A gesture recognition library of mobile device 400 can interpret the user's touch input and identify the touch input corresponding to a downward scrolling event or gesture associated with back-mounted touch surface 405. In the example of FIG. 5F, a user taps or strikes lightly on back-mounted touch surface 405 (as indicated by the arrow 433). A gesture recognition library of mobile device 400 can interpret the user's touch input and identify the touch input corresponding to a tap event associated with back-mounted touch surface 405.

Figure 6:
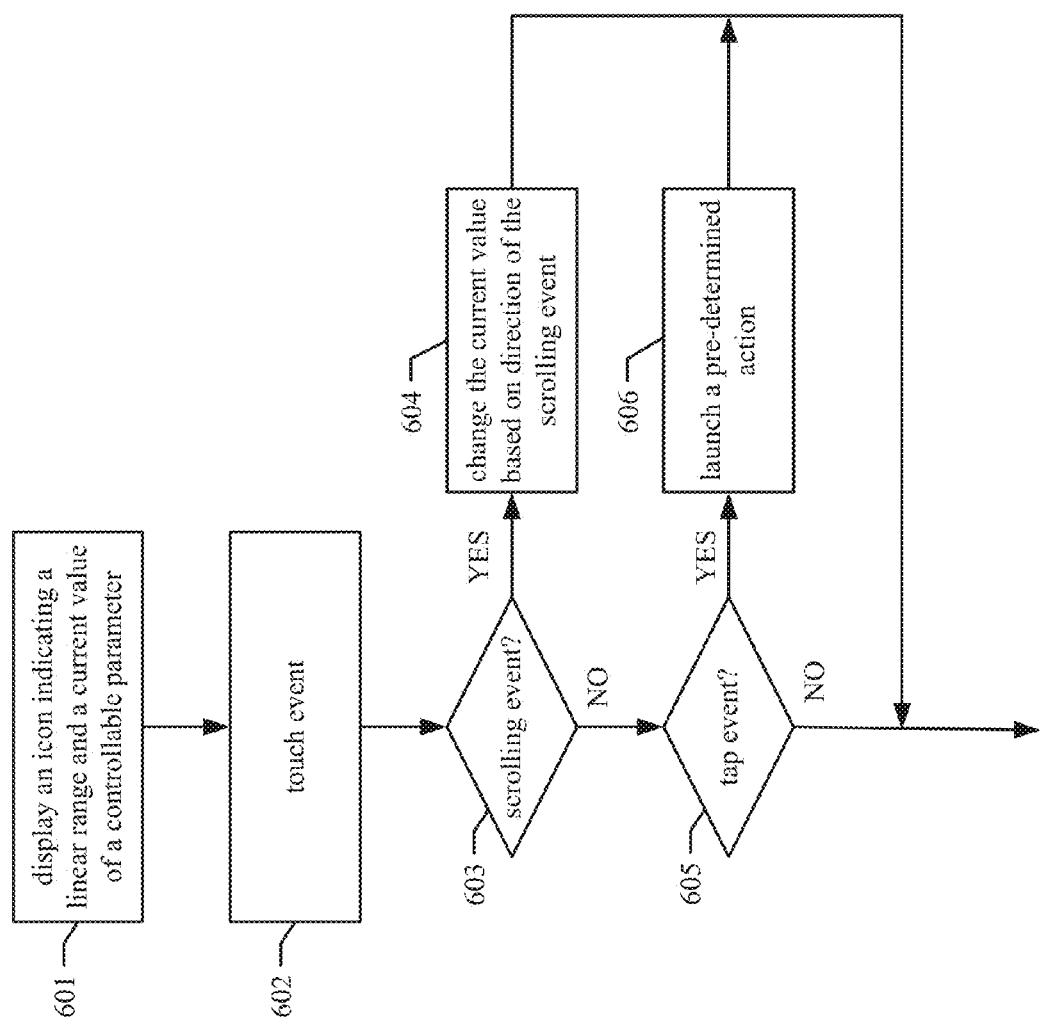
FIG. 6 illustrates an example method of controlling a parameter of an application by using a side-mounted touchpad.

In contrast to using hardware buttons and/or touch screen inputs to control a parameter of an application as illustrated in the examples of FIGS. 3A-3F (e.g., adjusting zoom distance of a camera application, changing play time of a video), FIG. 6 illustrates an example method of controlling a parameter of an application by using a side-mounted touchpad. Specifically, the example method of FIG. 6 may enable a user to control the parameter by scrolling along a side-mounted touchpad, or invoke an action by tapping on the side-mounted touchpad.

Figure 6A:
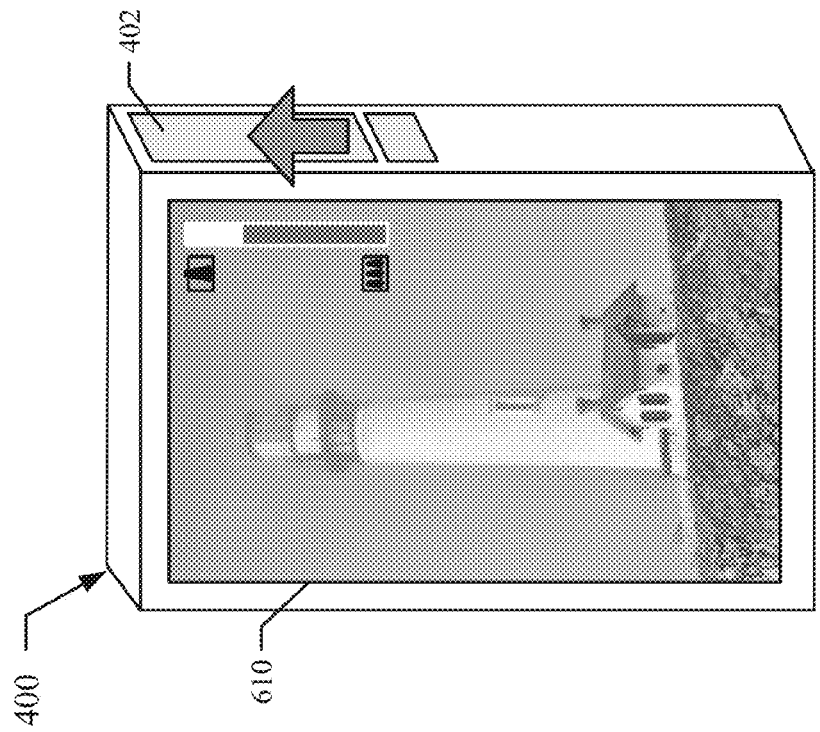
FIGS. 6A-6E illustrate examples of controlling an application parameter by using a side-mounted touchpad.
Figure 6B:
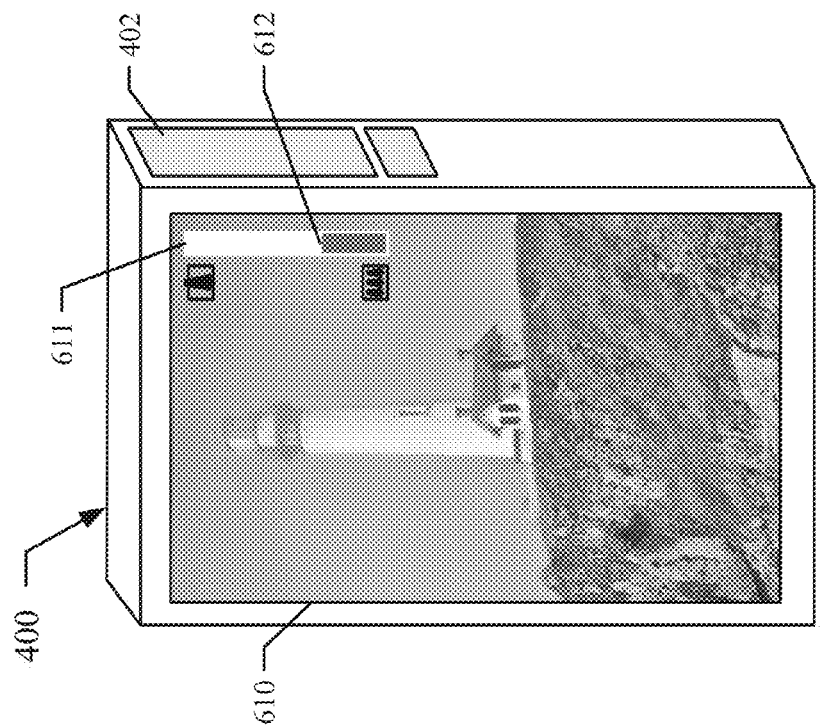
Figure 6C:
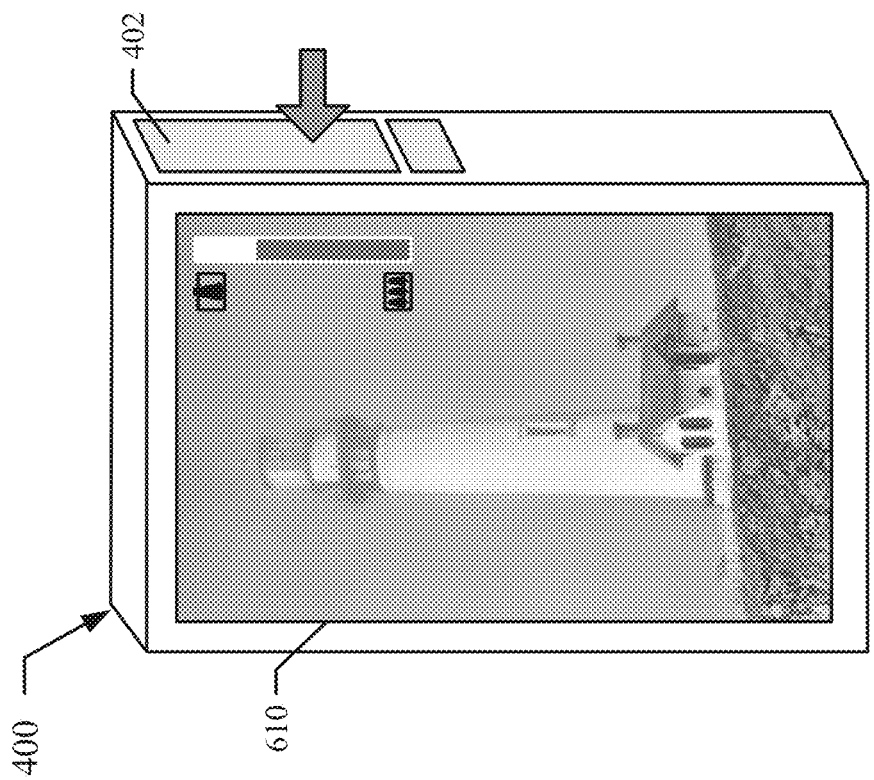

As a listener for touch events, the handler function can, responsive to a touch event, cause the application to adjust a controllable parameter of the application. In particular embodiments, the application may display a graphical element indicating a linear range and a current value of a controllable parameter (601). In some embodiments, the application may display the graphical element adjacent to the side-mounted touchpad. FIGS. 6A-6C illustrate an example user interface of a camera application hosted by a mobile device with a side-mounted touchpad. For example, a camera application hosted by mobile device 400 can display zoom bar 611 in the application's user interface 610, indicating a linear range (i.e., the length of the zoom bar) and a current value 612 of zoom distance. For example, the camera application can display the zoom bar 611 adjacent to side-mounted touchpad 402.

In some implementations, the mobile device 400 may have an accelerometer that a client application and/or operating system shell can poll in order to determine whether to rotate an image (such as a video or photograph) relative to the display. In one implementation, the graphical element, in such implementations, may remain adjacent to the touchpad 402. In some implementations, however, the directionality of the graphical element and the corresponding touch inputs applied to touchpad 402 may be inverted or rotated based on the orientation of the mobile device (as sensed by the accelerometer) and the current view. For example, when in a portrait view mode (as illustrated in FIG. 6A), the max zoom range may be at the upper portion of the graphical element (upper right corner relative to the device display) with the minimum zoom being at the bottom portion of the graphical element. If a user rotates the device 400 to a landscape view, the minimum and maximum zoom indicators may be reversed such that the minimum zoom indicator is now located in the corner of the display. A similar result may be achieved if a user rotates device 400 180 degrees relative to the view illustrated in FIG. 6A. Accordingly, the effect of the direction of a user's input relative to touchpad 402 may vary depending on the orientation of the device 400.

In particular embodiments, when a touch event occurs (602), the handler function may determine if the touch event is a scrolling event (603). In particular embodiments, if the handler function determines that the touch event is a scrolling event, the handler function may cause the application to change the current value of the controllable parameter based on direction of the scrolling event (604). For example, the camera application illustrated in FIG. 6A-6C can adjust the zoom distance displayed in the zoom bar by zooming in for an upward scrolling event (as illustrated by the arrow in FIG. 6B), or zooming out for a downward scrolling event. In some embodiments, the application may adjust the current value of the controllable parameter by an amount corresponding to a relative distance of the scrolling event. For example, the camera application illustrated in FIG. 6A-6C can adjust the zoom distance by a same percentage of the total linear range as the relative percentage distance of the scrolling event. In other embodiments, the application may adjust the current value of the controllable parameter to a value corresponding to the end location of the scrolling event. For example, the camera application illustrated in FIG. 6A-6C can adjust the zoom distance to a value displayed adjacent to the end location of the scrolling event, as illustrated in FIG. 6B.

In particular embodiments, the handler function may determine if the touch event is a tap event (605). In particular embodiments, if the handler function determines the touch event is a tap event, the handler function may cause the application to launch a pre-determined action (606). For example, a tap event as illustrated by the arrow in FIG. 6C can cause the camera application to capture the image. In another implementation, a tap event may cause the application to jump to a parameter value corresponding to the closest point of the tap event. In yet another implementation, the tap gesture can cause the application to toggle display of the graphical element on and off. The tap event may be either a single tap or a double tap.

Figure 6D:
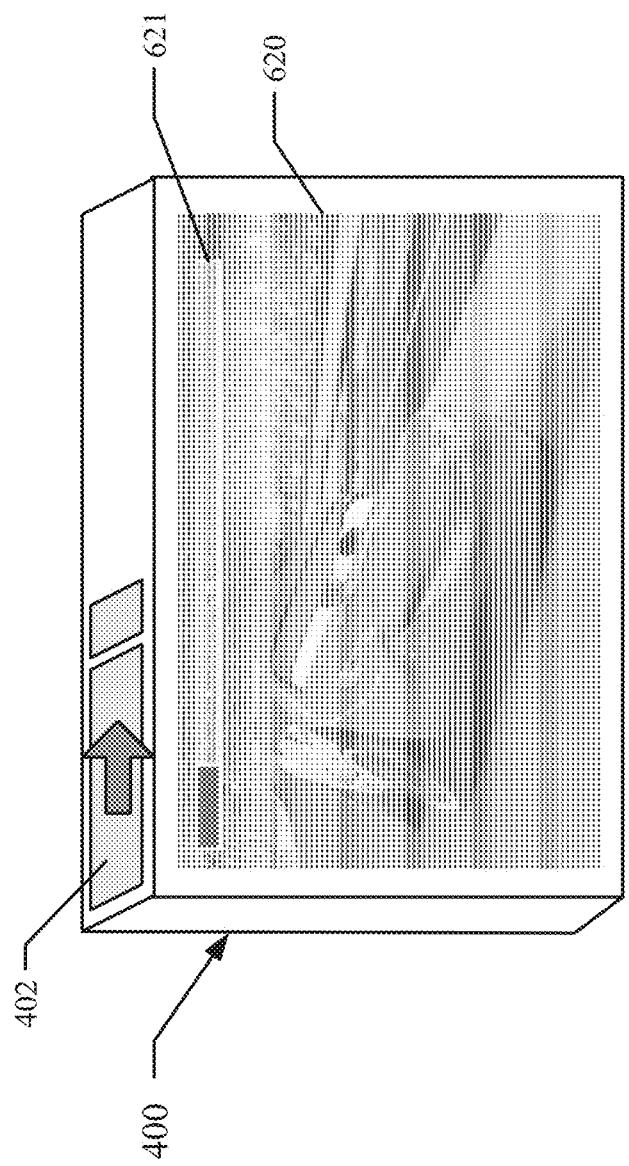
Figure 6E:
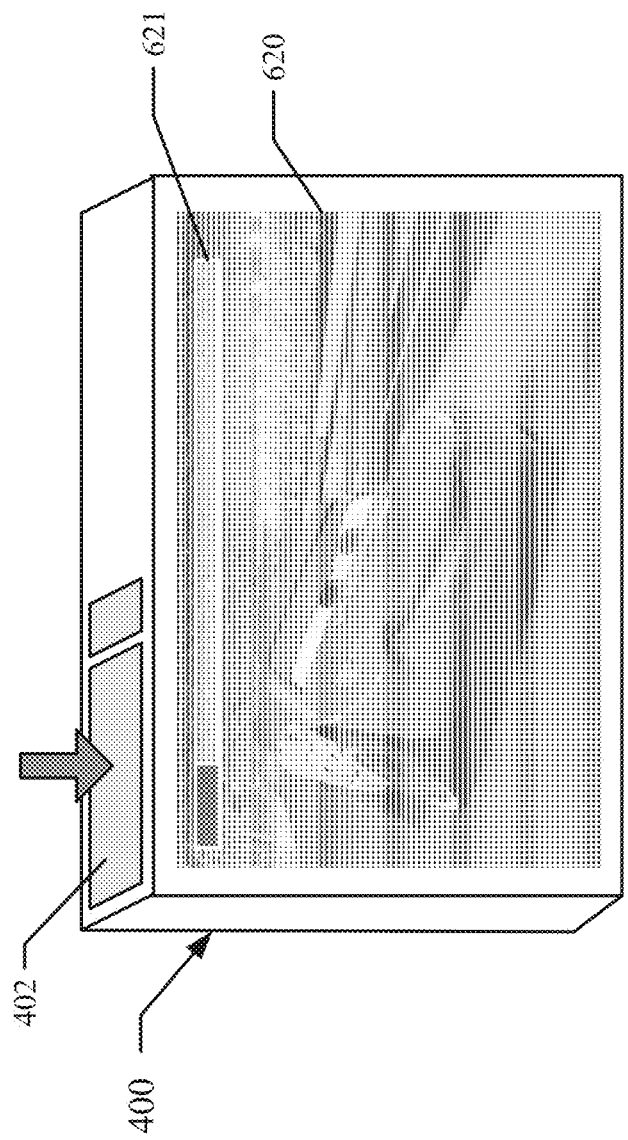
Figure 6F:
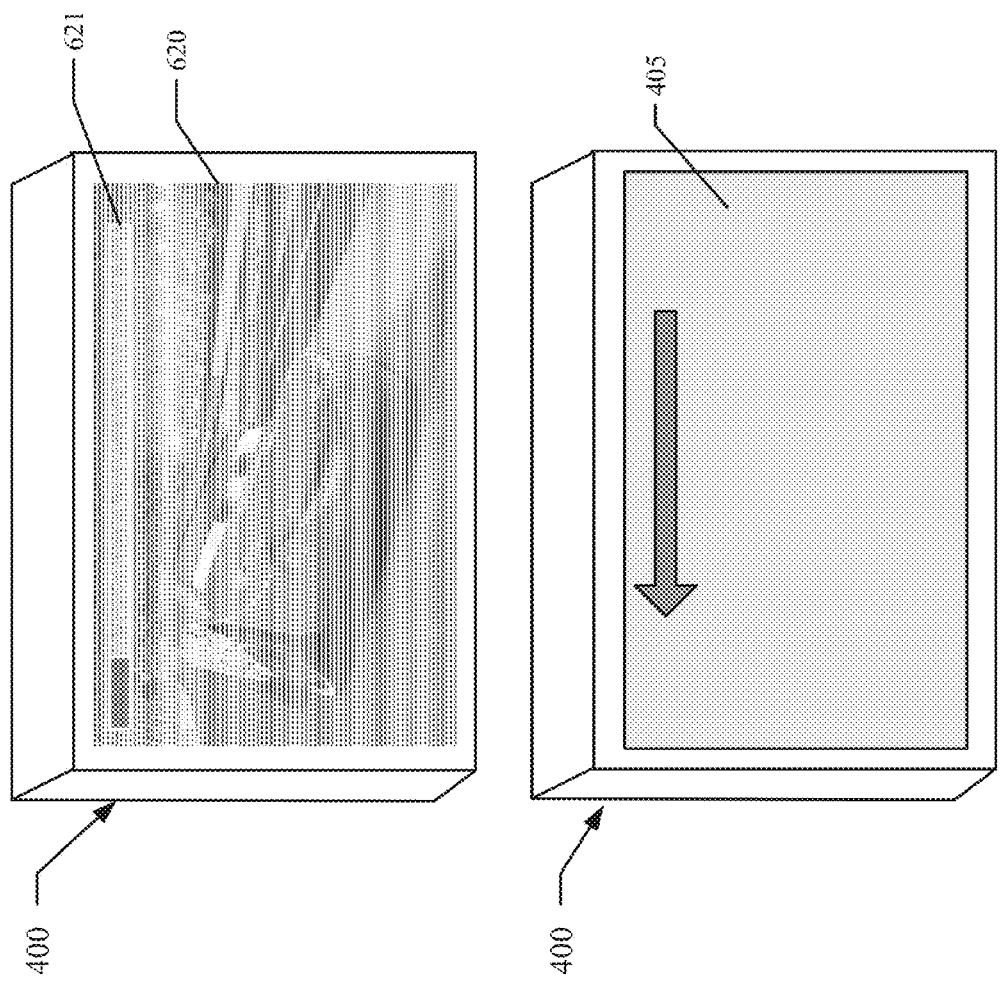

FIGS. 6D-6E illustrate another example of controlling an application parameter by using a side-mounted touchpad. FIGS. 6D-6E illustrate a user interface 620 of a media player application hosted by mobile device 400. In the implementation illustrated, the user interface 620 includes a playtime status bar 621. For example, a user can scroll down on side-mounted touchpad 402 (as illustrated by the arrow in FIG. 6D) to fast forward a video being presented by the media player application. For example, a user can tap on side-mounted touchpad 402 (as illustrated in FIG. 6E) to play or pause a video being presented by the media player application. Additionally, particular embodiments may enable controlling a parameter of an application by using the back-mounted touch surface described earlier. For example, a user can scroll down on back-mounted touch surface 405 (as illustrated by the arrow in FIG. 6F) to fast forward a video being presented by the media player application. For example, a user can tap on back-mounted touch surface 405 (as illustrated in FIG. 6G) to play or pause a video being presented by the media player application. Implementations of the invention can be used to control a variety of application control parameters depending on the type of application, such as a gaming application, media player, camera application, VoIP client, videophone client, and the like. Other parameter values can also be controlled, such as volume, brightness, zoom level, contrast, render speed, video quality, and the like.

Figure 7:
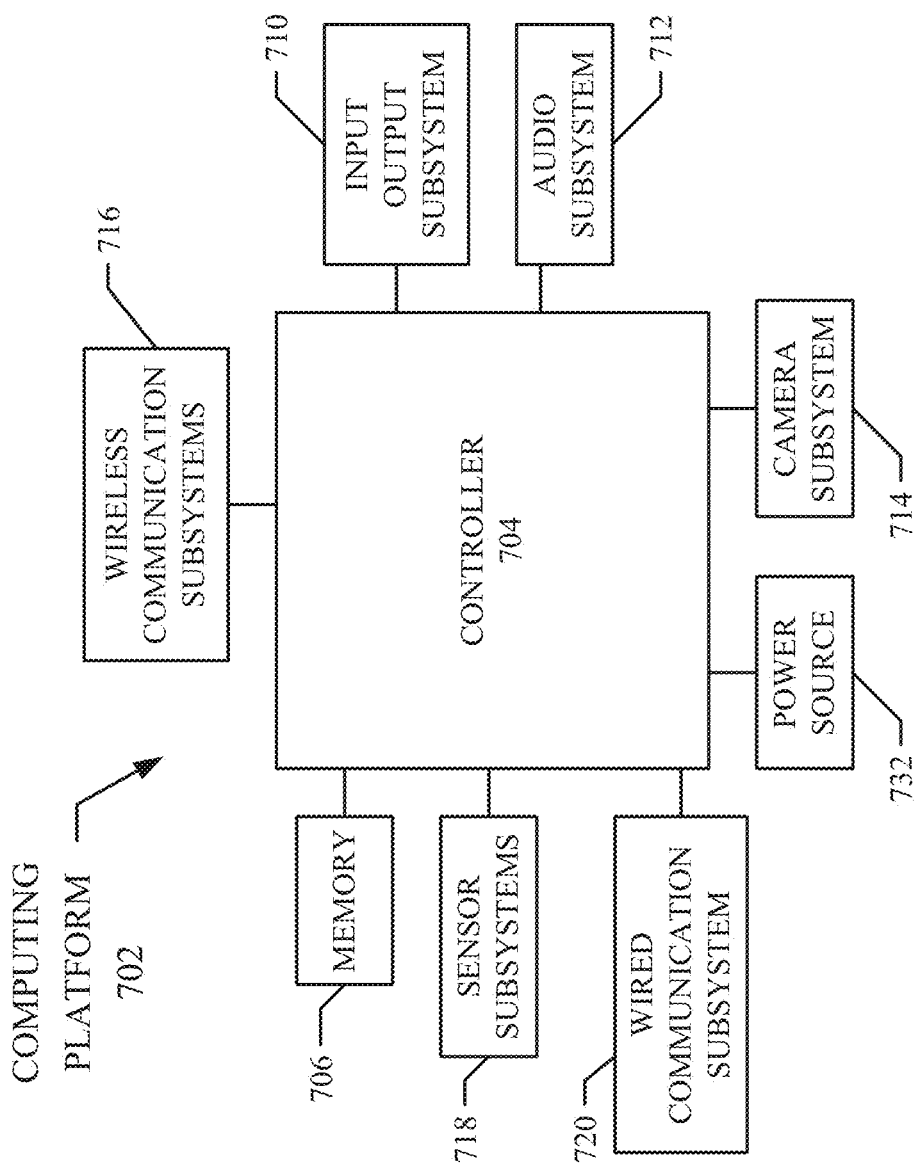
FIG. 7 illustrates an example mobile device platform.

The application and functionality described above can be implemented as a series of instructions stored on a computer-readable storage medium that, when executed, cause a programmable processor to implement the operations described above. While the mobile device 400 may be implemented in a variety of different hardware and computing systems, FIG. 7 shows a schematic representation of the main components of an example computing platform of a client or mobile device, according to various particular embodiments. In particular embodiments, computing platform 702 may comprise controller 704, memory 706, and input output subsystem 710. In particular embodiments, controller 704 which may comprise one or more processors and/or one or more microcontrollers configured to execute instructions and to carry out operations associated with a computing platform. In various embodiments, controller 704 may be implemented as a single-chip, multiple chips and/or other electrical components including one or more integrated circuits and printed circuit boards. Controller 704 may optionally contain a cache memory unit for temporary local storage of instructions, data, or computer addresses. By way of example, using instructions retrieved from memory, controller 704 may control the reception and manipulation of input and output data between components of computing platform 702. By way of example, controller 704 may include one or more processors or one or more controllers dedicated for certain processing tasks of computing platform 702, for example, for 2D/3D graphics processing, image processing, or video processing.

Controller 704 together with a suitable operating system may operate to execute instructions in the form of computer code and produce and use data. By way of example and not by way of limitation, the operating system may be Windows-based, Mac-based, or Unix or Linux-based, Android-based, or Symbian-based, among other suitable operating systems. The operating system, other computer code and/or data may be physically stored within memory 706 that is operatively coupled to controller 704.

Memory 706 may encompass one or more storage media and generally provide a place to store computer code (e.g., software and/or firmware) and data that are used by computing platform 702. By way of example, memory 706 may include various tangible computer-readable storage media including Read-Only Memory (ROM) and/or Random-Access Memory (RAM). As is well known in the art, ROM acts to transfer data and instructions uni-directionally to controller 704, and RAM is used typically to transfer data and instructions in a bi-directional manner. Memory 706 may also include one or more fixed storage devices in the form of, by way of example, hard disk drives (HDDs), solid-state drives (SSDs), flash-memory cards (e.g., Secured Digital or SD cards, embedded MultiMediaCard or eMMD cards), among other suitable forms of memory coupled bi-directionally to controller 704. Information may also reside on one or more removable storage media loaded into or installed in computing platform 702 when needed. By way of example, any of a number of suitable memory cards (e.g., SD cards) may be loaded into computing platform 702 on a temporary or permanent basis.

Input output subsystem 710 may comprise one or more input and output devices operably connected to controller 704. For example, input-output subsystem may include keyboard, mouse, one or more buttons, thumb wheel, and/or display (e.g., liquid crystal display (LCD), light emitting diode (LED), Interferometric modulator display (IMOD), or any other suitable display technology). Generally, input devices are configured to transfer data, commands and responses from the outside world into computing platform 702. The display is generally configured to display a graphical user interface (GUI) that provides an easy to use visual interface between a user of the computing platform 702 and the operating system or application(s) running on the mobile device. Generally, the GUI presents programs, files and operational options with graphical images. During operation, the user may select and activate various graphical images displayed on the display in order to initiate functions and tasks associated therewith. Input output subsystem 710 may also include touch based devices such as touchpad and touch screen. A touchpad is an input device including a surface that detects touch-based inputs of users. Similarly, a touch screen is a display that detects the presence and location of user touch inputs. Input output system 710 may also include dual touch or multi-touch displays or touchpads that can identify the presence, location and movement of more than one touch inputs, such as two or three finger touches.

In particular embodiments, computing platform 702 may additionally comprise audio subsystem 712, camera subsystem 712, wireless communication subsystem 716, sensor subsystems 718, and/or wired communication subsystem 720, operably connected to controller 704 to facilitate various functions of computing platform 702. For example, Audio subsystem 712, including a speaker, a microphone, and a codec module configured to process audio signals, can be utilized to facilitate voice-enabled functions, such as voice recognition, voice replication, digital recording, and telephony functions. For example, camera subsystem 712, including an optical sensor (e.g., a charged coupled device (CCD), or a complementary metal-oxide semiconductor (CMOS) image sensor), can be utilized to facilitate camera functions, such as recording photographs and video clips. For example, wired communication subsystem 720 can include a Universal Serial Bus (USB) port for file transferring, or an Ethernet port for connection to a local area network (LAN). Additionally, computing platform 702 may be powered by power source 732.

Wireless communication subsystem 716 can be designed to operate over one or more wireless networks, for example, a wireless PAN (WPAN) (such as, for example, a BLUETOOTH WPAN, an infrared PAN), a WI-FI network (such as, for example, an 802.11a/b/g/n WI-FI network, an 802.11s mesh network), a WI-MAX network, a cellular telephone network (such as, for example, a Global System for Mobile Communications (GSM) network, an Enhanced Data Rates for GSM Evolution (EDGE) network, a Universal Mobile Telecommunications System (UMTS) network, and/or a Long Term Evolution (LTE) network). Additionally, wireless communication subsystem 716 may include hosting protocols such that computing platform 702 may be configured as a base station for other wireless devices.

Sensor subsystem 718 may include one or more sensor devices to provide additional input and facilitate multiple functionalities of computing platform 702. For example, sensor subsystems 718 may include GPS sensor for location positioning, altimeter for altitude positioning, motion sensor for determining orientation of a mobile device, light sensor for photographing function with camera subsystem 714, temperature sensor for measuring ambient temperature, and/or biometric sensor for security application (e.g., fingerprint reader). Other input/output devices may include an accelerometer that can be used to detect the orientation of the device.

In particular embodiments, various components of computing platform 702 may be operably connected together by one or more buses (including hardware and/or software). As an example and not by way of limitation, the one or more buses may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, a Universal Asynchronous Receiver/Transmitter (UART) interface, a Inter-Integrated Circuit ($I^2C$) bus, a Serial Peripheral Interface (SPI) bus, a Secure Digital (SD) memory interface, a MultiMediaCard (MMC) memory interface, a Memory Stick (MS) memory interface, a Secure Digital Input Output (SDIO) interface, a Multi-channel Buffered Serial Port (McBSP) bus, a Universal Serial Bus (USB) bus, a General Purpose Memory Controller (GPMC) bus, a SDRAM Controller (SDRC) bus, a General Purpose Input/Output (GPIO) bus, a Separate Video (S-Video) bus, a Display Serial Interface (DSI) bus, an Advanced Microcontroller Bus Architecture (AMBA) bus, or another suitable bus or a combination of two or more of these.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a MultiMediaCard (MMC) card, an embedded MMC (eMMC) card, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101.

This disclosure contemplates one or more computer-readable storage media implementing any suitable storage. In particular embodiments, a computer-readable storage medium implements one or more portions of controller 704 (such as, for example, one or more internal registers or caches), one or more portions of memory 705, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, JavaScript, or a suitable extension thereof. In particular embodiments, software is expressed in a lower-level programming language, such as assembly language (or machine code). In particular embodiments, software is expressed in JAVA. In particular embodiments, software is expressed in Hyper Text Markup Language (HTML), Extensible Markup Language (XML), or other suitable markup language The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

What is claimed is:

1. A method comprising:
   by a computing device, displaying on a display of the computing device a graphical parameter-control element in a graphical user interface indicating a range and a position value of a controllable parameter of an application of the computing device;
   by the computing device, detecting a touch event on a touch-sensitive surface of the computing device; and
   by the computing device, determining that the touch event is a scrolling event, and scrolling the position value along the range based on a direction of the scrolling event, wherein the position value is adjusted by a relative amount within the range mapping to a relative distance of the scrolling event along the touch-sensitive surface.

2. The method of claim 1, wherein the touch-sensitive surface is a side-mounted touchpad.

3. The method of claim 1, wherein the relative distance of the scrolling event comprises a ratio between:
a distance between start and end locations of the scrolling event; and
a total length of the touch-sensitive surface.

4. The method of claim 1, wherein:
the application of the computing device is a camera application;
the controllable parameter is a zoom level of the camera application;
the graphical parameter-control element is a zoom bar;
the range is a zoom range of the camera application; and
the position value corresponds to a zoom-level value of the camera application.

5. The method of claim 1, wherein:
the application of the computing device is a media-player application;
the controllable parameter is progress of playback of media by the media-player application;
the graphical parameter-control element is a playback-progress bar;
the range is a playback time of the media; and
the position value corresponds to a point in the playback time of the media.

6. The method of claim 1, wherein the display of the graphic parameter-control element in the graphical user interface is based on an orientation of the computing device.

7. A device comprising:
a display;
a touch-sensitive surface;
one or more processors; and
a memory coupled to the processors comprising instructions executable by the processors, the processors being operable when executing the instructions to:
display on the display a graphical parameter-control element in a graphical user interface indicating a range and a position value of a controllable parameter of an application of the device;
detect a touch event on the touch-sensitive surface; and
determine that the touch event is a scrolling event, and scroll the position value along the range based on a direction of the scrolling event, wherein the position value is adjusted by a relative amount within the range mapping to a relative distance of the scrolling event along the touch-sensitive surface.

8. The device of claim 7, wherein the touch-sensitive surface is a side-mounted touchpad.

9. The device of claim 7, wherein the relative distance of the scrolling event comprises a ratio between:
a distance between start and end locations of the scrolling event; and
a total length of the touch-sensitive surface.

10. The device of claim 7, wherein the display of the graphical parameter-control element in the graphical user interface is based on an orientation of the device.

11. The device of claim 7 wherein:
the application of the device is a camera application;
the controllable parameter is a zoom level of the camera application;
the graphical parameter-control element is a zoom bar;
the range is a zoom range of the camera application; and
the position value corresponds to a zoom-level value of the camera application.

12. The device of claim 7, wherein:
the application of the device is a media-player application;
the controllable parameter is progress of playback of media by the media-player application;
the graphical parameter-control element is a playback-progress bar;
the range is a playback time of the media; and
the position value corresponds to a point in the playback time of the media.

13. One or more computer readable non-transitory storage media embodying software that is operable when executing on a computing device to:
display on the display a graphical parameter-control element in a graphical user interface indicating a range and a position value of a controllable parameter of an application of the device;
detect a touch event on a touch-sensitive surface of the computing device; and
determine that the touch event is a scrolling event, and scroll the position value along the range based on a direction of the scrolling event, wherein the position value is adjusted by a relative amount within the range mapping to a relative distance of the scrolling event along the touch-sensitive surface.

14. The media of claim 13, wherein the touch-sensitive surface is a side-mounted touchpad.

15. The media of claim 13, wherein the relative distance of the scrolling event comprises a ratio between:
a distance between start and end locations of the scrolling event; and
a total length of the touch-sensitive surface.

16. The media of claim 13, wherein the display of the graphic parameter-control element in the graphical user interface is based on an orientation of the computing device.

17. The media of claim 13, wherein:
the application of the computing device is a camera application;
the controllable parameter is a zoom level of the camera application;
the graphical parameter-control element is a zoom bar;
the range is a zoom range of the camera application; and
the position value corresponds to a zoom-level value of the camera application.

18. The media of claim 13, wherein:
the application of the computing device is a media-player application;
the controllable parameter is progress of playback of media by the media-player application;
the graphical parameter-control element is a playback-progress bar;
the range is a playback time of the media; and
the position value corresponds to a point in the playback time of the media.

* * * * *